United States Patent
Park et al.

(10) Patent No.: US 7,269,443 B2
(45) Date of Patent: Sep. 11, 2007

(54) MOBILE COMMUNICATION UNIT WITH CAMERA LENS OPENING MEANS IN CLOSED FOLDER

(75) Inventors: Seung-Min Park, Seoul (KR); In-Gon Pak, Seoul (KR)

(73) Assignee: Samsung Electronics Co., Ltd. (KR)

( * ) Notice: Subject to any disclaimer, the term of this patent is extended or adjusted under 35 U.S.C. 154(b) by 324 days.

(21) Appl. No.: 10/328,196

(22) Filed: Dec. 23, 2002

(65) Prior Publication Data

US 2003/0125079 A1    Jul. 3, 2003

(30) Foreign Application Priority Data

Dec. 29, 2001    (KR) ................. 2001-87735

(51) Int. Cl.
*H04M 1/00* (2006.01)
*H04M 1/38* (2006.01)

(52) U.S. Cl. .................. 455/556.2; 455/575.3; 455/566

(58) Field of Classification Search ............ 455/556.1, 455/557, 575.3, 575.4, 128, 550.1, 575.1, 455/566, 90, 556.2; 348/14, 14.02; 345/169, 345/156
See application file for complete search history.

(56) References Cited

U.S. PATENT DOCUMENTS

| 5,414,444 A * | 5/1995 | Britz ............................ 345/156 |
| 6,069,648 A * | 5/2000 | Suso et al. ............... 348/14.02 |
| 6,125,289 A * | 9/2000 | Lee ........................... 455/575.3 |
| 6,137,525 A * | 10/2000 | Lee et al. ................. 348/14.02 |
| 6,466,202 B1 * | 10/2002 | Suso et al. ................... 345/169 |
| 6,704,586 B2 * | 3/2004 | Park ......................... 455/575.3 |
| 6,792,293 B1 * | 9/2004 | Awan et al. ................. 455/566 |
| 2001/0019946 A1 * | 9/2001 | Okuda .......................... 455/90 |
| 2001/0019964 A1 * | 9/2001 | Shimizu ..................... 455/557 |
| 2001/0036845 A1 * | 11/2001 | Park ............................ 455/566 |
| 2002/0016182 A1 * | 2/2002 | Kubo et al. ................. 455/550 |
| 2002/0037754 A1 * | 3/2002 | Hama et al. ................ 455/566 |
| 2002/0045467 A1 * | 4/2002 | Hama .......................... 455/567 |
| 2002/0160724 A1 * | 10/2002 | Arai et al. ..................... 455/90 |
| 2004/0023684 A1 * | 2/2004 | Sato et al. ............... 455/550.1 |
| 2004/0248625 A1 * | 12/2004 | Yoshida et al. .......... 455/575.1 |

FOREIGN PATENT DOCUMENTS

JP    2000253124 A  *  3/1999

* cited by examiner

*Primary Examiner*—Joseph Feild
*Assistant Examiner*—Kiet Doan
(74) *Attorney, Agent, or Firm*—The Farrell Law Firm

(57) ABSTRACT

Disclosed is a mobile communication unit comprising a main housing with upper and lower surfaces, a folder with upper and lower surfaces, and a hinge for rotatably connecting the folder to the main housing, and further comprising (a) a camera lens opening means formed on an edge of the lower surface of the main housing correspondingly to the hinge, (b) a pair of side hinge arms respectively formed on both sides of the camera lens opening means, (c) a first LCD and a second LCD respectively formed on the upper and lower surfaces of the folder, and (d) a camera hinge housing formed on the hinge in a designated direction so as to expose a camera lens, wherein the camera lens is exposed to be opposite to the user when the folder is opened from the main housing, and a camera lens assembly including the camera lens is exposed to the user via the camera lens opening means when the folder is closed into the main housing.

6 Claims, 8 Drawing Sheets

MOBILE COMMUNICATION UNIT WITH CAMERA LENS OPENING MEANS IN CLOSED FOLDER

PRIORITY

This application claims priority to an application entitled "PORTABLE PHONE WITH CAMERA LENS OPENING MEANS IN CLOSED FOLDER", filed in the Korean Industrial Property Office on Dec. 29, 2001 and assigned Serial No. 2001-87735, the contents of which are hereby incorporated by reference.

BACKGROUND OF THE INVENTION

1. Field of the Invention

The present invention relates to a mobile communication unit, and more particularly to a mobile communication unit which photographs a subject using a camera lens even in a closed condition of a folder.

2. Description of the Related Art

Usually, mobile communication units provide a communication service to a user by communicating with a counterpart via wireless communication with a base station. These mobile communication units are used for voice communication, picture communication, Internet communication such as e-mail transmission or Internet gaming, data transmission, etc. The aforementioned mobile communication units include cellular phones, digital phones, PDAs (Personal Digital Assistants), or HHPs (Hand Held Phones). The mobile communication units may be divided into bar-type units, flip-type units, and folder-type units, according to their shape. Further, the mobile communication units may be divided into necklace-type units, wristlet-type units, etc., according to their wearing location.

Among the variously divided mobile communication units, the mobile communication unit for picture communication requires a unit for photographing a subject. Generally, a camera lens assembly is used as the photographing unit. The conventional camera lens assembly comprises a camera lens, a CCD (Charge Coupled Device), and associated circuitry. Among the various mobile communication units, a folder type terminal provided with a camera lens is described in detail.

FIGS. 1 and 2 are perspective views of a conventional mobile communication unit in closed condition of a folder closed into a main housing and in opened condition of the folder opened from the main housing, respectively. FIG. 3 is a perspective view showing a lower surface of the conventional mobile communication unit. As shown in FIGS. 1 and 2, the conventional folder type terminal comprises a main housing 50, a folder 60, and a hinge, which serves to rotatably connect the folder 60 to the main housing 50. The folder 60 is opened from and closed into the main housing 50 centering on a hinge axis A.

The main housing 50 comprises a plurality of keys 512 and a microphone unit 514. The folder 60 comprises a camera lens 70, a speaker unit 612, and a LCD (Liquid Crystal Display) 614. The hinge includes a pair of side arms 510 which are typically formed on the main housing 50 and a center hinge arm 610 which is typically formed on the folder 60. Herein, the center hinge arm 610 is coaxially associated with the side hinge arms 510. In order to communicate with a counterpart utilizing pictures or to photograph a subject, a user must open the folder 60 from the main housing 50 to at least a designated angle centering on the hinge axis A, thereby placing the user opposite to the camera lens 70 of the folder 60, so as to allow picture communication with the counterpart.

However, the aforementioned conventional mobile communication unit with the camera lens for picture communication requires the folder to be opened from the main housing to at least the designated angle, placing the user opposite to the camera lens of the folder. Therefore, it is impossible to photograph the subject when the folder is closed into the main housing.

SUMMARY OF THE INVENTION

Therefore, the present invention has been made in view of the above problems, and it is an object of the present invention to provide a mobile communication unit which can photograph a subject using its camera lens even in a closed condition of a folder.

It is another object of the present invention to provide a mobile communication unit comprising an opening on a lower surface of an edge of a main housing nearest to the hinge, thereby exposing the camera lens even in the closed condition of the folder.

In accordance with the present invention, the above and other objects can be accomplished by the provision of a mobile communication unit having a main housing with upper and lower surfaces, a folder with upper and lower surfaces, and a hinge for rotatably connecting the folder to the main housing, and further comprising (a) camera lens opening means formed on an edge of the lower surface of the main housing corresponding to the hinge, (b) a pair of side hinge arms on both sides of the camera lens opening means, (c) a first LCD and a second LCD respectively formed on the upper and lower surfaces of the folder, and (d) a camera hinge housing formed on the hinge in a designated direction so as to expose a camera lens, wherein the camera lens is exposed to the user when the folder is opened from the main housing, and a camera lens assembly including the camera lens is exposed to the user via the camera lens opening means when the folder is closed into the main housing.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
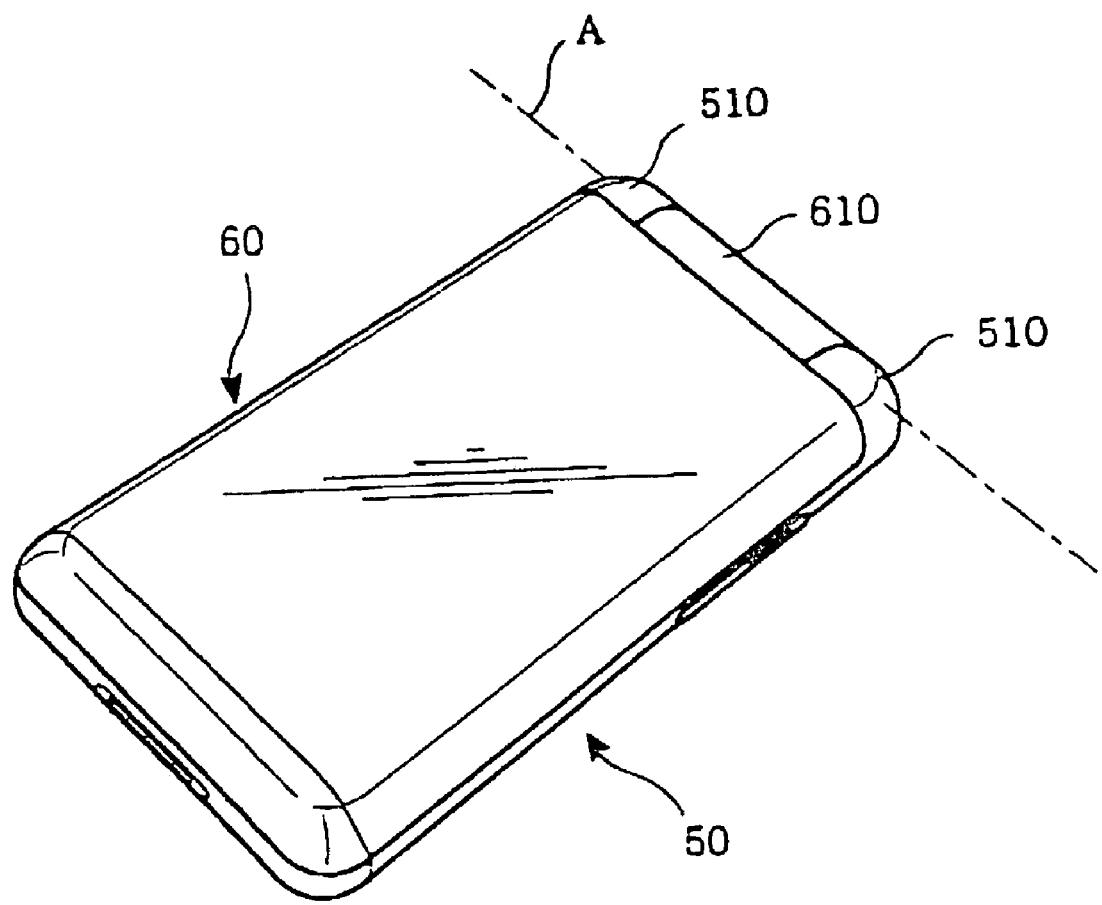
FIG. 1 is a perspective view of a conventional mobile communication unit in closed condition of a folder into a main housing.
Figure 2:
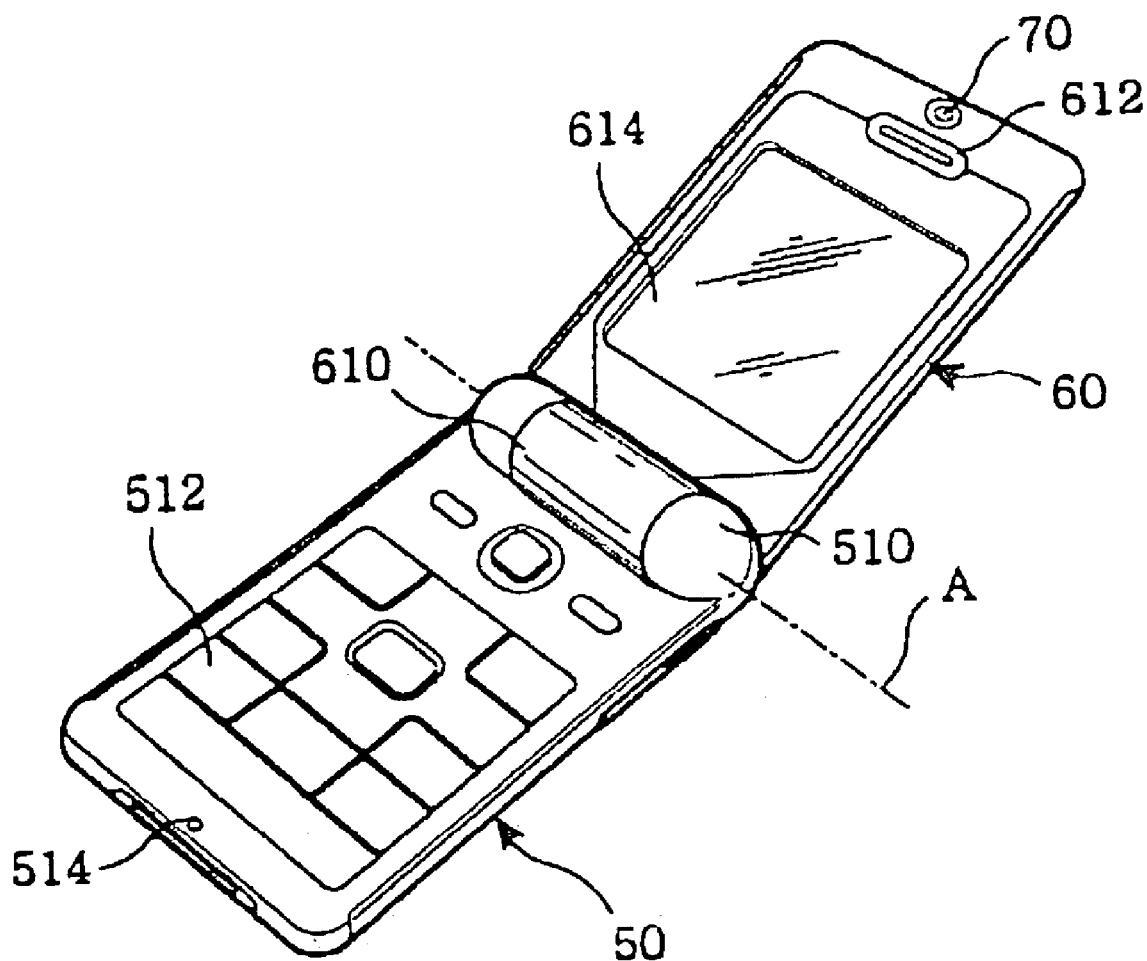
FIG. 2 is a perspective view of the conventional mobile communication unit in opened condition of the folder from the main housing.
Figure 3:
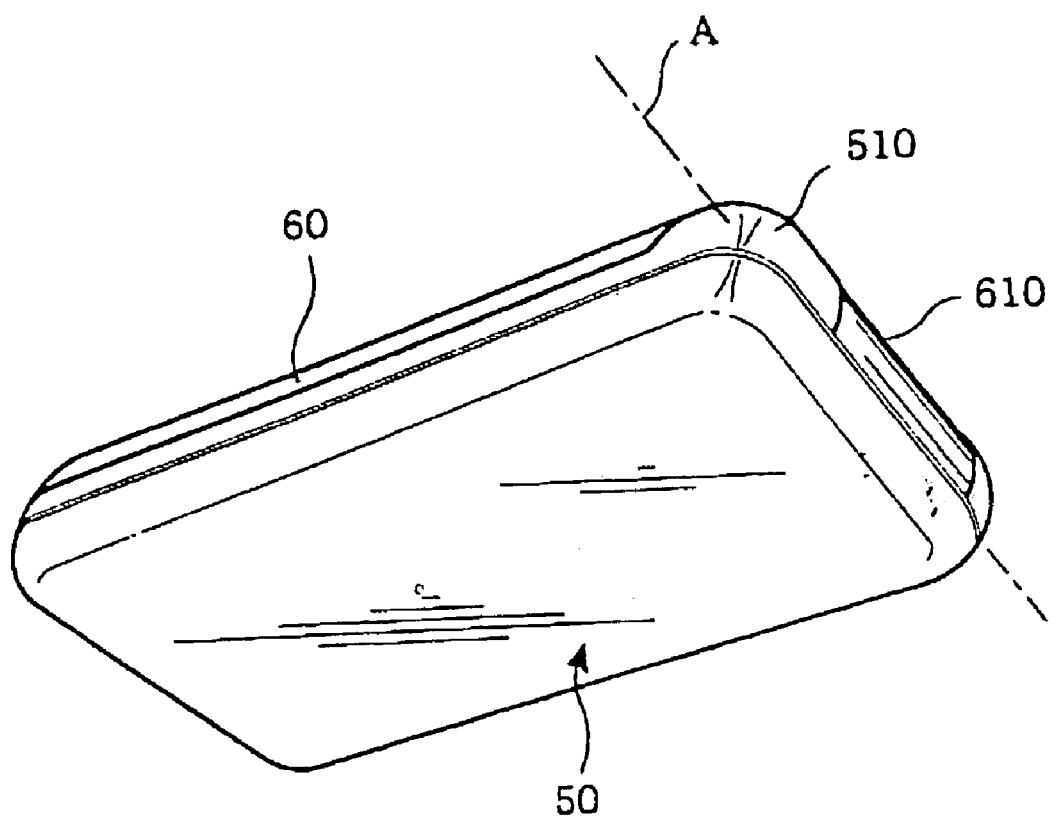
FIG. 3 is a perspective view showing a lower surface of the conventional mobile communication unit.

Now, preferred embodiments of the present invention will be described in detail with reference to the annexed drawings. In the drawings, the same or similar elements are denoted by the same reference numerals even though they are depicted in different drawings. The following description omits detailed description of known functions and configurations to avoid obscuring the subject matter of the present invention.

Figure 4:
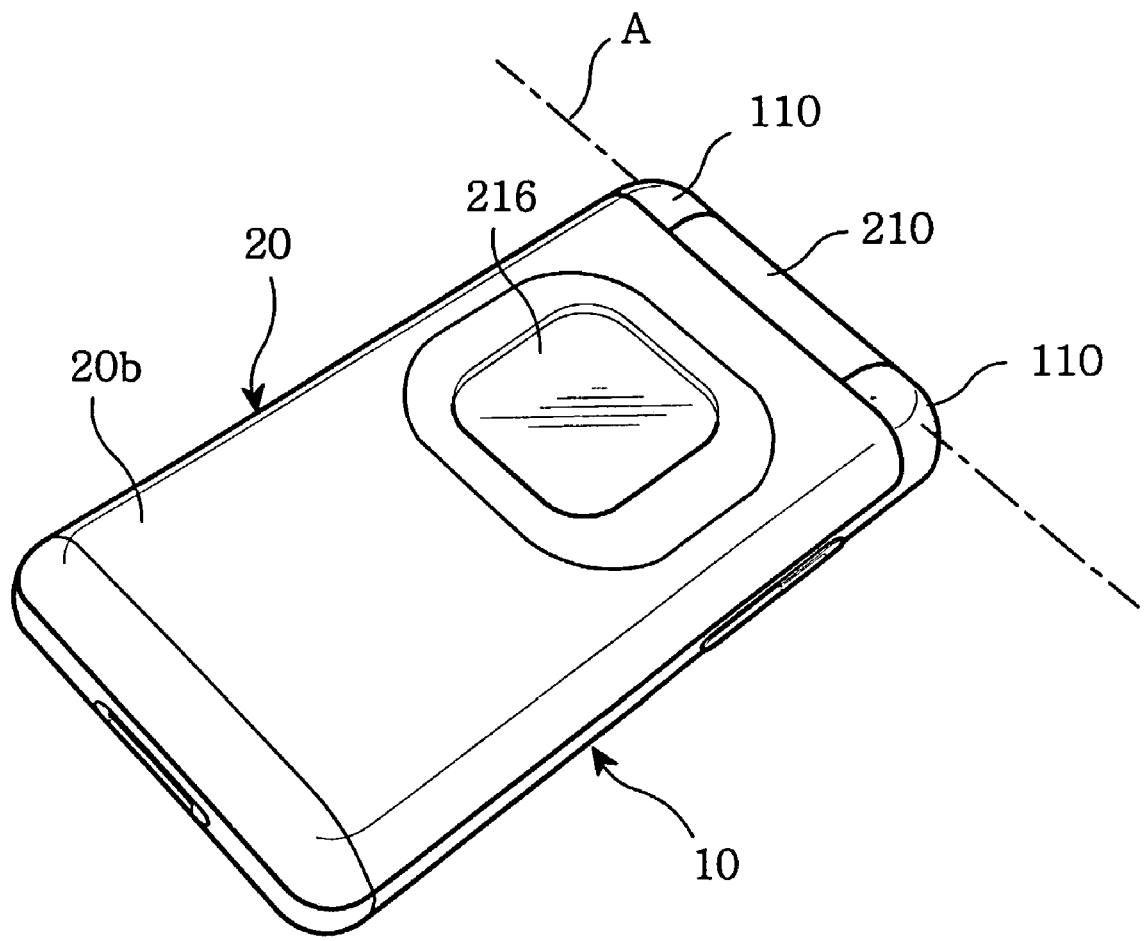
FIG. 4 is a perspective view of a mobile communication unit in a closed condition in accordance with a first preferred embodiment of the present invention.
Figure 5:
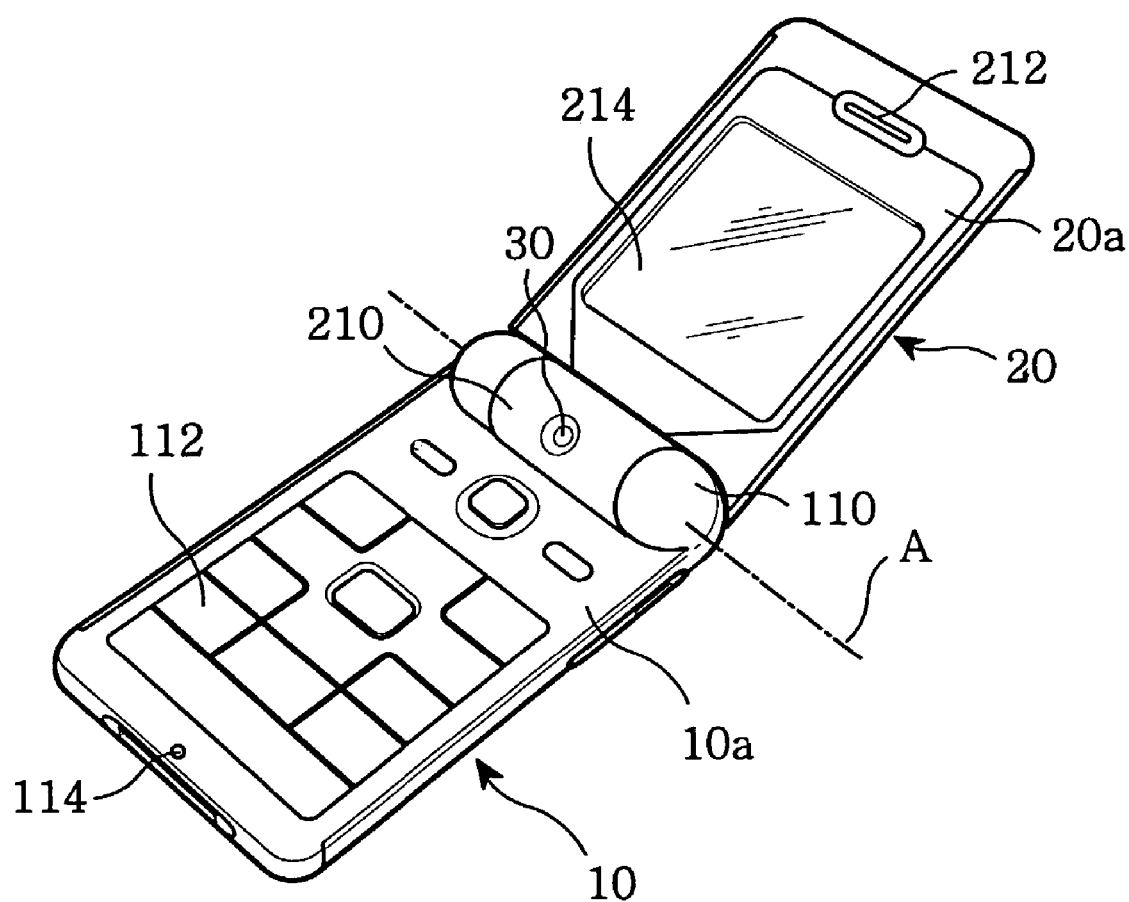
FIG. 5 is a perspective view of the mobile communication unit in an opened condition in accordance with the first preferred embodiment of the present invention.
Figure 6:
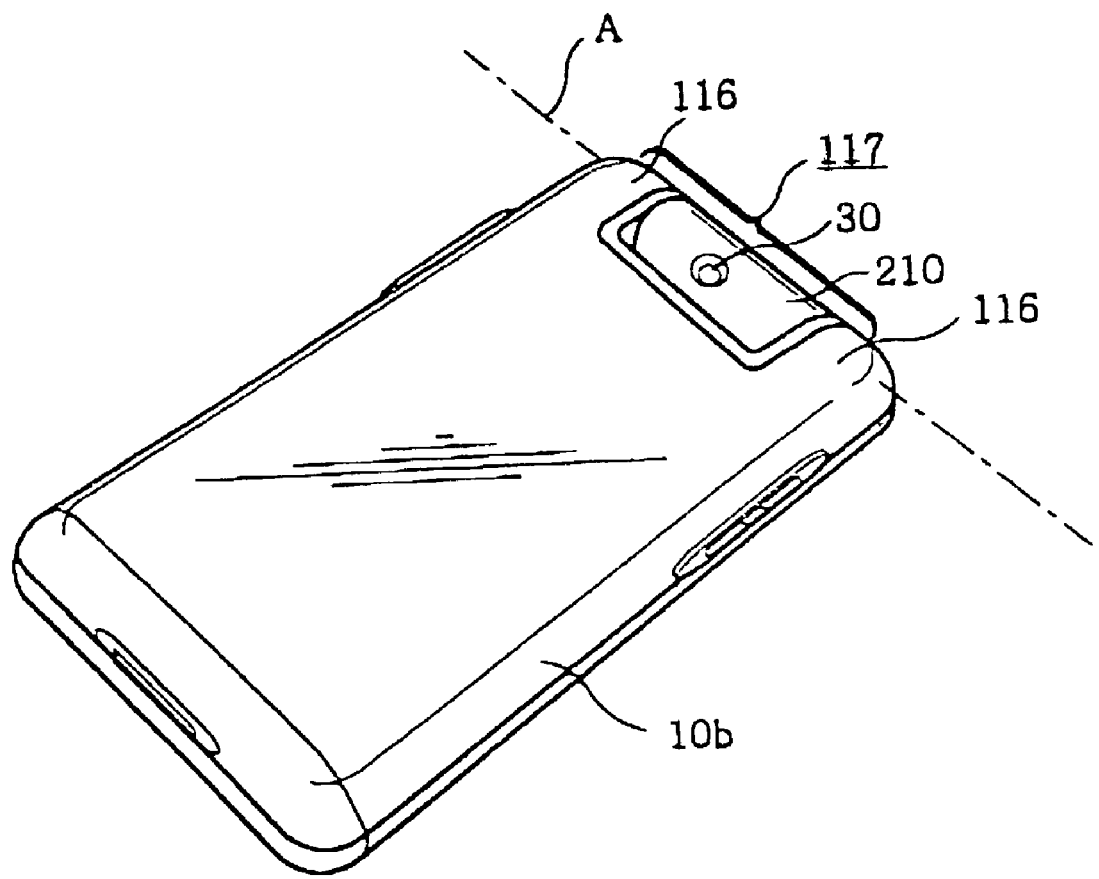
FIGS. 6 and 7 are perspective views showing a lower surface of the mobile communication unit in accordance with the first preferred embodiment of the present invention.
Figure 7:
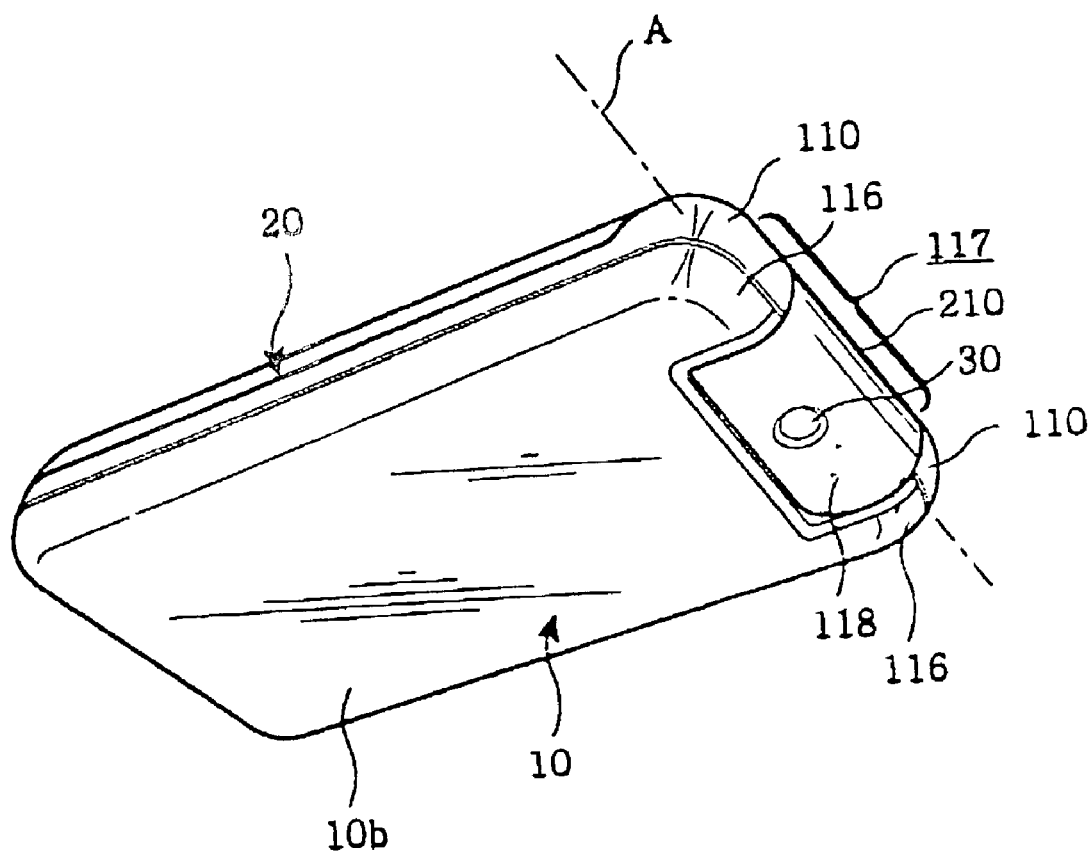

As shown in FIGS. 4 to 7, in accordance with a first preferred embodiment of the present invention, a mobile communication unit comprises a camera lens 30 positioned on a folder 20. The mobile communication unit of the present invention can photograph a desired subject regardless of whether the folder 20 is open or closed. Herein, the subject may be a user or an object desired to be photographed. That is, in the mobile communication unit of the present invention, the camera lens 30 is exposed regardless of the opening and closing operations of the folder 20, thereby allowing photographing of the desired subject. The mobile communication unit shown in FIG. 4 is a folder type terminal.

More particularly, the aforementioned mobile communication unit comprises a main housing 10, the folder 20 including a camera hinge housing 210 with the camera lens 30, a hinge for rotatably connecting the folder 20 to the main housing 10, and a camera lens opening means 118. Herein, the camera lens opening means 118 is formed in a designated position of a lower surface 10b of the main housing 10, thereby exposing the camera lens 30 even in the closed condition of the folder 20. Preferably, the camera lens opening means 118 is an opening formed as a designated shape. The folder 20 is opened from and closed into the main housing 10 around a hinge axis A. The hinge comprises a pair of side hinge arms 110 and camera hinge housing 210. The side arms 110 are arranged along the hinge axis A. The camera hinge housing 210 is associated between the side hinge arms 110. The side hinge arms 110 protrude from an upper surface 10a of the main housing 10. The camera hinge housing 210 is formed on the folder 20 and is preferably cylindrical in shape. The camera lens opening means 118 is interposed between the side hinge arms 110.

The main housing 10 comprises a key array including a plurality of keys 112 formed in designated positions of its upper surface 10a or side surfaces, and a microphone unit 114. The folder 20 comprises a first LCD 214 formed on its upper surface 20a, a second LCD 216 formed on its lower surface 20b, and the camera hinge housing 210. A camera lens assembly (not shown) is accommodated in the camera hinge housing 210. The camera lens assembly comprises the camera lens 30, a known CCD, and circuitry associated with the CCD. Only the camera lens 30 is shown in the drawings. Those skilled in the art will appreciate the above-described camera lens and CCD.

Herein, the camera hinge housing 210 is formed integrally with the folder 20. Therefore, as the folder 20 rotates, the camera hinge housing 210 also rotates.

The camera lens opening means 118, formed on or adjacent an edge of the lower surface 10b of the main housing 10, is disposed corresponding to the hinge. The camera lens opening means 118 is disposed on an edge 117 of a rear end of the main housing 10. Thus, when the camera lens 30 on the folder 20 rotates according to the opening and closing operations of the folder 20, the camera lens 30 is exposed to the outside via the camera lens opening means 118, thereby allowing photographing of the subject even in the closed condition of the folder 20.

When the folder 20 is fully opened from the main housing 10, the camera lens 30 is exposed and faces the user, and when the folder 20 is closed into the main housing 10, the camera lens 30 is exposed via the camera lens opening means 118, thereby allowing photographing the subject regardless of the opening and closing operations of the folder 20. That is, when the folder 20 is closed into the main housing 10, the camera lens 30 is disposed in the position of the camera lens opening means 18. The camera lens opening means 118 is formed on the edge of the lower surface 10b of the main housing 10.

Preferably, when the folder 20 is opened away from the main housing 10, data obtained by photographing using the camera lens 30 are displayed on the first LCD 214. Further, when the folder 20 is closed into the main housing 10, data obtained by photographing using the camera lens 30 are displayed on the second LCD 216.

Figure 8:
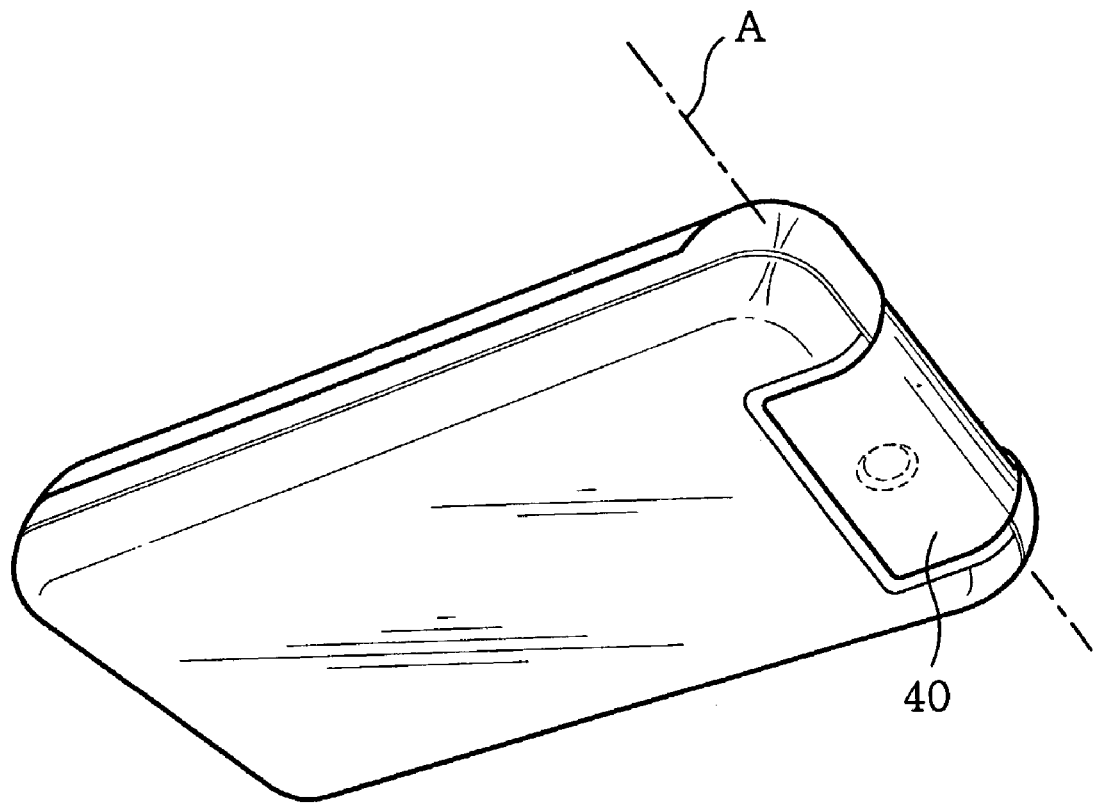
FIG. 8 is a perspective view showing a lower surface of a mobile communication unit in accordance with a second preferred embodiment of the present invention.

FIG. 8 is a perspective view showing a lower surface of a mobile communication unit in accordance with a second preferred embodiment of the present invention. As shown in FIG. 8, a transparent window 40 for protecting the camera lens used in the closed condition of the folder from external environmental stresses may be further provided.

Although only a few embodiments of the present invention have been described in detail, those skilled in the art will appreciate that various modifications, additions, and substitutions to the specific elements are possible, without departing from the scope and spirit of the invention as disclosed in the accompanying claims.

As apparent from the above description, the mobile communication unit of the present invention comprises the opening formed on the edge of the main housing correspondingly to the hinge, thereby allowing photographing of a subject using the camera lens even in the closed condition of the folder and displaying data obtained by photographing the subject on the LCD.

What is claimed is:

1. A mobile communication unit having a main housing with upper and lower surfaces, a folder with upper and lower surfaces, and a hinge for rotatably connecting the folder to the main housing, said communication unit further comprising:

(a) a camera lens opening means formed on an edge of the lower surface of the main housing corresponding to the hinge;

(b) a pair of side hinge arms respectively formed on both sides of the camera lens opening means;

(c) a first LCD and a second LCD respectively formed on the upper and lower surfaces of the folder (FIG. 9, Illustrate first LCD such as No. 4 and second LCD such as No. 5), and (d) a camera hinge housing formed on the hinge in a designated direction so as to expose a camera lens, the camera hinge housing integrally extending from the folder and rotatable with the folder, the camera hinge housing fully disposed inside the camera lens opening means to protect the camera hinge housing from the environment, wherein the camera lens is exposed and faces the user when the folder is opened from the main housing, and a camera lens assembly including the camera lens is exposed via the camera lens opening means when the folder is closed into the main housing, and further wherein data obtained by photographing using the camera lens is displayed on the first LCD when the folder is opened away from the main housing, and is displayed on the second LCD when the folder is closed into the main housing.

2. The mobile communication unit as set forth in claim 1, wherein the camera lens is disposed in the position of the camera lens opening means when the folder is closed into the main housing.

3. The mobile communication unit as set forth in claim 1, wherein the camera hinge housing is formed integrally with the folder.

4. The mobile communication unit as set forth in claim 1, wherein the camera lens opening means is disposed on an edge of a rear end of the main housing.

5. The mobile communication unit as set forth in claim 1, wherein the camera lens opening means further comprises a transparent window.

6. The mobile communication unit as set forth in claim 1, wherein the camera lens opening means is an opening formed as a designated shape.

* * * * *